(12) United States Patent
Guillot

(10) Patent No.: US 12,736,834 B2
(45) Date of Patent: Sep. 15, 2026

(54) LENS ELEMENT

(71) Applicant: Essilor International, Charenton-le-Pont (FR)

(72) Inventor: Matthieu Guillot, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 282 days.

(21) Appl. No.: 18/293,116

(22) PCT Filed: Aug. 1, 2022

(86) PCT No.: PCT/EP2022/071519

§ 371 (c)(1),
(2) Date: Jan. 29, 2024

(87) PCT Pub. No.: WO2023/007028

PCT Pub. Date: Feb. 2, 2023

(65) Prior Publication Data

US 2024/0329429 A1 Oct. 3, 2024

(30) Foreign Application Priority Data

Jul. 30, 2021 (EP) .................................... 21306076

(51) Int. Cl.
*G02C 7/06* (2006.01)
*G02C 7/02* (2006.01)

(52) U.S. Cl.
CPC ............. *G02C 7/066* (2013.01); *G02C 7/027* (2013.01); *G02C 2202/24* (2013.01)

(58) Field of Classification Search
CPC .... G02C 7/066; G02C 7/027; G02C 2202/24; G02C 7/06

(Continued)

(56) References Cited

U.S. PATENT DOCUMENTS 10,571,717 B2 * 2/2020 Neitz ..................... G02C 7/022
2021/0373357 A1 12/2021 Guillot et al.
(Continued)

FOREIGN PATENT DOCUMENTS

CN 208969368 U 6/2019
CN 110687689 A 1/2020
(Continued)

OTHER PUBLICATIONS

Japanese Office Action issued May 20, 2025, in Japanese Patent Application No. 2024-505413 (with unedited computer-generated English translation), 13 pages.
(Continued)

*Primary Examiner* — Tuyen Tra
(74) *Attorney, Agent, or Firm* — Oblon, McClelland, Maier & Neustadt, L.L.P.

(57) ABSTRACT

Method for determining a lens element intended to be mounted on a spectacle frame and to be worn in front of an eye of a wearer, the lens element comprising; —a refraction area having a refractive power based on prescribed refractive power Px for said eye of the wearer, the refraction area comprising at least a central zone, —a plurality of optical elements having an optical function of not focusing an image on the retina of the eye of the wearer, wherein the method comprises: —obtaining frame data representing the spectacle frame on which the lens element is intended to be mounted; —obtaining wearer's data representing at least one parameter of the face of the wearer, —determining fitting data representing the spectacles positioned on the face of the wearer based on the frame data and the wearer's data; and —optimizing at least one parameter of the optical elements based on the fitting data.

13 Claims, 5 Drawing Sheets

(58) Field of Classification Search
USPC .................... 351/41, 159.01, 159.41, 159.42
See application file for complete search history.

(56) References Cited

U.S. PATENT DOCUMENTS

| | | | | |
|---|---|---|---|---|
| 2022/0365367 | A1* | 11/2022 | Trumm | G02C 7/028 |
| 2023/0288730 | A1* | 9/2023 | Weiss | G16H 50/30 |

FOREIGN PATENT DOCUMENTS

| | | | |
|---|---|---|---|
| CN | 210690971 | U | 6/2020 |
| EP | 3 640 712 | A1 | 4/2020 |
| JP | 5-172545 | A | 7/1993 |
| JP | 2003-307714 | A | 10/2003 |
| JP | 2011-508277 | A | 3/2011 |
| WO | WO 2009/065968 | A1 | 5/2009 |
| WO | WO 2013/149303 | A1 | 10/2013 |
| WO | WO 2014/059465 | A1 | 4/2014 |
| WO | WO 2019/166659 | A1 | 9/2019 |
| WO | WO 2020/099549 | A1 | 5/2020 |
| WO | WO 2020/261213 | A1 | 12/2020 |
| WO | WO 2022/136056 | A1 | 6/2022 |

OTHER PUBLICATIONS

International Search Report & Written Opinion mailed on Nov. 11, 2022 in PCT/EP2022/071519 filed on Aug. 1, 2022 (11 pages).

Japanese Office Action issued December 9. 2024 in Japanese Patent Application No. 2024-505413 with English translation, 11 pgs.

* cited by examiner 10
16
U
L
20
12
14
T N

LENS ELEMENT

TECHNICAL FIELD

The disclosure relates to a lens element intended to be worn in front of an eye of a wearer and having at least a prescribed refractive power, and to a method, for example implemented by computer means for determining a lens element according to the disclosure.

BACKGROUND

Myopia of an eye is characterized by the fact that the eye focuses distant objects in front of its retina. Myopia is usually corrected using a concave lens and hyperopia is usually corrected using a convex lens.

Myopia, also referred as to short-sightedness, has become a major public health problem worldwide. Accordingly, a large effort has been made to develop solutions aiming to slow down myopia progression.

Most of the recent management strategies for myopia and/or hyperopia progression involves acting on the peripheral vision using optical defocus. This approach has received a great deal of interest since works in chicks and primates showed that foveal refractive error could be manipulated through peripheral optical defocus without the involvement of an intact fovea. Several methods and products are used to slow down myopia progression by inducing such peripheral optical defocus. Among these solutions, orthokeratology contact lenses, soft bifocal lenses and progressive contact lenses, circular progressive ophthalmic lenses, and lenses with array of microlenses have been shown to be more or less effective, through randomized controlled trials.

Myopia control solutions comprising array of microlenses have been proposed, in particular by the applicant. The purpose of this array of microlenses is to provide an optical blurred image, other than on the retina, for example in front of the retina, triggering a stop signal that limit the eyes growth, while enabling a good vision.

However, lens designs of the prior art are not optimized for the spectacle frame on which they are intended to be mounted, which may reduce the effect of lens element to reduce the progression of the abnormal refraction of the eye of the wearer.

Therefore, there is a need to determine and provide lenses element adapted for the wearer and for the spectacle frame on which they are intended to be mounted.

SUMMARY

To this end, the disclosure proposes a lens element intended to be mounted on a spectacle frame and to be worn in front of an eye of a wearer, the lens element comprising:

- a refraction area having a refractive power based on a prescribed refractive power Px for said eye of the wearer and comprising at least the central zone,
- a plurality of optical elements having an optical function of not focusing an image on the retina of the eye of the wearer, wherein the optical elements are arranged based at least on the prescribed refractive power Px and the shape of the spectacle frame.

Advantageously, not focusing an image on the retina of the wearer allows creating a control signal that reduces the progression of abnormal refractions of the eye such as myopia or hyperopia. Moreover, considering the shape of the spectacle frame allows improving the effect of the myopia control signal while maintaining good visual performances for the wearer. In other words, the invention allows both improving the slowing down the progression of the abnormal refraction of the eye of the wearer and maintaining the best visual acuity for the wearer.

According to further embodiments which can be considered alone or in combination:

- the lens element is divided in three complementary zones, the central zone, a nasal side and a temporal side; and/or
- the lens element is divided in three complementary zones, the central zone, an upper side and a lower side; and/or
- the central zone has a characteristic dimension greater than 4 mm and smaller than 20 mm; and/or
- the central zone is centered on a reference point of the lens element; and/or
- the reference point is one of a geometrical center, optical center, near vision point, or far vision point of the lens element; and/or
- the refraction area has a first refractive power based on a prescription for correcting an abnormal refraction of the eye of the wearer and at least a second refractive power different from the first refractive power; and/or
- the difference between the first optical power and the second optical power is greater than or equal to 0.5 D; and/or
- the refraction area is formed as the area other than the areas formed by the plurality of optical elements; and/or
- at least one, for example all of, the optical elements is configured to not focus on the retina of the wearer; and/or
- at least one, for example all of, the optical elements is configured to focus in front of retina of the wearer; and/or
- at least one, for example all of, the optical elements is configured to focus behind of retina of the wearer; and/or
- at least one, for example all of, the optical elements is configured to create a caustic in front of the retina of the eye of the wearer; and/or
- at least one, for example more than 50%, preferably all, of the optical elements has a spherical optical function in standard wearing conditions; and/or
- at least one, for example more than 50%, preferably all, of the optical elements has a non-spherical optical function in standard wearing conditions; and/or
- at least one, for example more than 50%, preferably all, of the optical elements comprises a cylindrical power; and/or
- at least one, for example more than 50%, preferably all, of the optical elements is a multifocal refractive microlens; and/or
- at least one, for example more than 50%, preferably all, of the optical elements is an aspherical microlens; and/or
- at least one, for example more than 50%, preferably all, of the optical elements comprises an aspherical surface, with or without a rotational symmetry; and/or
- at least one, for example more than 50%, preferably all, of the optical elements is a toric refractive microlens; and/or
- at least one, for example more than 50%, preferably all, of the optical elements comprises a toric surface; and/or
- at least one, for example more than 50%, preferably all, of the optical elements is made of a birefringent material; and/or at least one, for example more than 50%, preferably all, of the optical elements is a diffractive element; and/or
at least one, for example more than 50%, preferably all, of the diffractive elements comprise a metasurface structure; and/or
at least one, for example more than 50%, preferably all, of the optical elements is a multifocal binary component; and/or
at least one, for example more than 50%, preferably all, of the optical elements is a pixelated lens; and/or
at least one, for example more than 50%, preferably all, of the optical elements is a n-Fresnel lens; and/or
at least two, for example more than 50%, preferably all, of the optical elements are independent; and/or
the density of optical elements in the nasal side of the lens element is different from the density of optical elements in the temporal side of the lens element; and/or
the density of optical elements in the nasal side of the lens element is greater than the density of optical elements in the temporal side of the lens element; and/or
the density of optical elements in the nasal side of the lens element is smaller than the density of optical elements in the temporal side of the lens element; and/or
the optical power and/or the mean optical power of optical elements in the nasal side of the lens element is different from the optical power and/or the mean optical of optical elements in the temporal side of the lens element; and/or
the optical power and/or the mean optical of optical elements in the nasal side of the lens element is greater than the optical power and/or the mean optical of optical elements in the temporal side of the lens element; and/or
the optical power and/or the mean optical of optical elements in the nasal side of the lens element is smaller than the optical power and/or the mean optical of optical elements in the temporal side of the lens element; and/or
the diameter of optical elements in the nasal side of the lens element is different from the diameter of optical elements in the temporal side of the lens element; and/or
the diameter of optical elements in the nasal side of the lens element is greater than the diameter of optical elements in the temporal side of the lens element; and/or
the diameter of optical elements in the nasal side of the lens element is smaller than the diameter of optical elements in the temporal side of the lens element; and/or
the prismatic angle of optical elements in the nasal side of the lens element is different from the prismatic angle of optical elements in the temporal side of the lens element;
and/or
the prismatic angle of optical elements in the nasal side of the lens element is greater than the prismatic angle of optical elements in the temporal side of the lens element;
and/or
the prismatic angle of optical elements in the nasal side of the lens element is smaller than the prismatic angle of optical elements in the temporal side of the lens element;
and/or
the density of optical elements in the upper side of the lens element is different from the density of optical elements in the lower side of the lens element; and/or
the density of optical elements in the upper side of the lens element is greater than the density of optical elements in the lower side of the lens element; and/or
the density of optical elements in the upper side of the lens element is smaller than the density of optical elements in the lower side of the lens element; and/or
the optical power and/or the mean optical power of optical elements in the upper side of the lens element is different from the optical power and/or the mean optical of optical elements in the lower side of the lens element; and/or
the optical power and/or the mean optical of optical elements in the upper side of the lens element is greater than the optical power and/or the mean optical of optical elements in the lower side of the lens element; and/or
the optical power and/or the mean optical of optical elements in the upper side of the lens element is smaller than the optical power and/or the mean optical of optical elements in the lower side of the lens element; and/or
the diameter of optical elements in the upper side of the lens element is different from the diameter of optical elements in the lower side of the lens element; and/or
the diameter of optical elements in the upper side of the lens element is greater than the diameter of optical elements in the lower side of the lens element; and/or
the diameter of optical elements in the upper side of the lens element is smaller than the diameter of optical elements in the lower side of the lens element; and/or
the prismatic angle of optical elements in the upper side of the lens element is different from the prismatic angle of optical elements in the lower side of the lens element;
and/or
the prismatic angle of optical elements in the upper side of the lens element is greater than the prismatic angle of optical elements in the lower side of the lens element; and/or
the prismatic angle of optical elements in the upper side of the lens element is smaller than the prismatic angle of optical elements in the lower side of the lens element; and/or
the optical elements are configured so that along at least one section of the lens element, the mean sphere of the optical elements increases from a point of said section towards the peripheral part of said section; and/or
the optical elements are configured so that along at least one section of the lens element, the mean cylinder of optical elements increases from a point of said section towards the peripheral part of said section; and/or
the optical elements are configured so that along the at least one section of the lens element the mean sphere and/or the mean cylinder of the optical elements increases from the center of said section towards the peripheral part of said section; and/or
the refraction area comprises an optical center and the optical elements are configured so that along any section passing through the optical center of the lens element, the mean sphere and/or the mean cylinder of the optical elements increases from the optical center towards the peripheral part of the lens element; and/or the optical elements are configured so that in standard wearing condition the at least one section is a horizontal section; and/or the refraction area comprises a far vision reference point, a near vision reference, and a meridian joining the far and near vision reference points, the optical elements are configured so that in standard wearing conditions along any horizontal section of the lens element the mean sphere and/or the mean cylinder of the optical elements increases from the intersection of said horizontal section with the meridian towards the peripheral part of the lens element; and/or the mean sphere and/or the mean cylinder increase function along the sections are different depending on the position of said section along the meridian; and/or the mean sphere and/or the mean cylinder increase function along the sections are unsymmetrical; and/or the optical elements are configured so that along the at least one section of the lens element the mean sphere and/or the mean cylinder of optical elements increases from a first point of said section towards the peripheral part of said section and decreases from a second point of said section towards the peripheral part of said section, the second point being closer to the peripheral part of said section than the first point; and/or the mean sphere and/or the mean cylinder varying function along the at least one section is a Gaussian function; and/or the mean sphere and/or the mean cylinder varying function along the at least one section is a Quadratic function; and/or at least part, for example all, of the optical elements have a contour shape being inscribable in a circle having a diameter greater than or equal to 0.2 mm, for example greater than or equal to 0.4 mm, for example greater than or equal to 0.6 mm, for example greater than or equal to 0.8 mm and smaller than or equal to 2.0 mm, for example smaller than or equal to 1.0 mm; and/or at least one, for example all, of the optical elements are non-contiguous; and/or at least one, for example all, of the optical elements are contiguous; and/or at least one, for example all, of the optical elements have an annular shape, for example around part of the refraction area; and/or at least part, for example all, of the optical elements are located on the front surface of the lens element; and/or at least part, for example all, of the optical elements are located on the back surface of the lens element; and/or at least part, for example all, of the optical elements are located between the front and the back surfaces of the lens element; and/or the lens element comprises an ophthalmic lens bearing the refraction area and a clip-on bearing the plurality of at least three optical elements adapted to be removably attached to the ophthalmic lens when the lens element is worn; and/or for every circular zone having a radius comprised between 2 and 4 mm comprising a geometrical center located at a distance of the optical center of the lens element greater or equal to said radius+5 mm, the ratio between the sum of areas of the parts of the optical elements located inside said circular zone and the area of said circular zone is comprised between 20% and 70%; and/or the optical elements are positioned on a network, for example a structured mesh; and/or the optical elements are positioned on a squared mesh or a hexagonal mesh or a triangle mesh or an octagonal mesh; and/or the mesh structure is a random mesh, for example a Voronoi mesh; and/or the optical elements are positioned along a plurality of concentric rings; and/or the optical elements are organized in at least two groups of optical elements, each group of optical elements is organized in at least two concentric rings having the same center, the concentric ring of each group of optical element is defined by an inner diameter corresponding to the smallest circle that is tangent to at least one optical element of said group and an outer diameter corresponding to the largest circle that is tangent to at least one optical elements of said group; and/or at least part of, for example all, the concentric rings of optical elements are centered on the optical center of the surface of the lens element on which said optical elements are disposed; and/or the concentric rings of optical elements have a diameter comprised between 9.0 mm and 60 mm; and/or the distance between two successive concentric rings of optical elements is greater than or equal to 2.0 mm, for example 3.0 mm, preferably 5.0 mm, the distance between two successive concentric rings being defined by the difference between the inner diameter of a first concentric ring and the outer diameter of a second concentric ring, the second concentric ring being closer to the periphery of the lens element; and/or the lens element further comprises optical elements positioned radially between two concentric rings; and/or the optical elements are organized in a plurality of radial segments; and/or the plurality of radial segments are centered on the central zone of the lens element.

The disclosure further relates to an eyewear equipment intended to be worn by a wearer and comprising;

a spectacle frame, and at least one lens element according to the disclosure, wherein the at least one lens element is mounted on the spectacle frame.

The disclosure further relates to a method, for example implemented by computer means, for determining a lens element intended to be mounted on a spectacle frame and to be worn in front of an eye of a wearer, the lens element comprising;

a refraction area having a refractive power based on prescribed refractive power Px for said eye of the wearer, the refraction area comprising at least a central zone, a plurality of optical elements having an optical function of not focusing an image on the retina of the eye of the wearer, wherein the method comprises:

obtaining frame data representing the spectacle frame on which the lens element is intended to be mounted, obtaining wearer's data representing at least one parameter of the face of the wearer, determining fitting data representing the spectacles positioned on the face of the wearer based on the frame data and the wearer's data, and optimizing at least one parameter of the optical elements based on the fitting data.

Advantageously, the method according to the disclosure allows providing lens elements comprising areas having different optical properties that takes into consideration the shape of the spectacle frame. In particular, the process allows providing a lens element best adapted for the wearer, providing at the same time an optimum function of slowing down an abnormal refraction of the wearer while maintaining the best visual performances and/or comfort for the wearer.

According to further embodiments of the disclosure which can be considered alone or in combination:

- the method comprises determining a temporo-nasal ratio quantifying the ratio between a dimension of a nasal side of the lens element and a dimension of an opposite temporal side of the lens element based on the fitting data, and the at least one parameter of the optical elements is optimized based on the temporo-nasal ratio; and/or
- the method comprises determining an upper-lower ratio quantifying the ratio between a dimension of the upper side of the lens element and a dimension of an opposite lower side of the lens element based on the fitting data; and the at least one parameter of the optical elements is optimized based on upper-lower ratio; and/or
- the method comprises determining a lens-eye distance between a back surface of the lens element and the eye of the wearer based on the fitting data; and the at least one optical parameter of the optical elements is optimized based on the lens-eye distance; and/or
- optimizing at least one parameter of the optical elements comprises determining a first density of the optical elements in a first side of the lens element, the first density being different from the density of the optical elements in the opposite second side of the lens element; and/or
- optimizing at least one parameter of the optical elements comprises determining a first optical power of the optical elements in a first side of the lens element, the first optical power being different from the optical power of the optical elements in the second opposite side of the lens element; and/or
- optimizing at least one parameter of the optical elements comprises determining a first size of the optical elements in a first side of the lens element, the first size being different from the size of the optical elements in the second opposite side of the lens element; and/or
- optimizing at least one parameter of the optical elements comprises determining a first prismatic angle of the lens elements in a first side of the lens element, the first prismatic angle being different from the prismatic angle of the optical elements in the second opposite side of the lens element; and/or
- optimizing at least one parameter of the optical elements comprises determining a disposition of the optical elements on the lens element and a size of the central zone; and/or
- the frame data comprises at least one of a quotation A, and/or quotation B, and/or dimension of the bridge, and/or contour of the frame; and/or
- the frame data relate to a selected predefined category of frame; and/or
- the wearer's data comprises at least one of pupillary distance, and/or position of the eye of the wearer; and/or
- the method comprises manufacturing the lens element based on the wearer's data and the optimized parameter of the optical element; and/or
- the method comprises applying a layer of coating at least partially on part of a surface of the lens element, for example on part of the refraction area and part of the optical elements.

BRIEF DESCRIPTION OF THE DRAWINGS

Embodiments of the invention will now be described, by way of example only, and with reference to the following drawings in which.

Elements in the figures are illustrated for simplicity and clarity and have not necessarily been drawn to scale. For example, the dimensions of some of the elements in the figure may be exaggerated relative to other elements to help to improve the understanding of the embodiments of the present invention.

DETAILED DESCRIPTION

In the reminder of the description, terms like «up», «bottom», «horizontal», «vertical», «above», «below», «front», «rear» or other words indicating relative position may be used. These terms are to be understood in the wearing conditions of the optical lens.

The disclosure relates to a lens element adapted for a person and intended to be mounted on a spectacle frame and to be worn in front of an eye of said person.

In the context of the present invention, the term "lens element" can refer to an optical lens or a spectacle optical lens edged to fit a specific spectacle frame or an ophthalmic lens, or an optical device adapted to be positioned on the ophthalmic lens. The optical device may be positioned on the front or back surface of the ophthalmic lens. The optical device may be an optical patch or film. The optical device may be adapted to be removably positioned on the ophthalmic lens for example a clip configured to be clipped on a spectacle frame comprising the ophthalmic lens.

Figure 1:
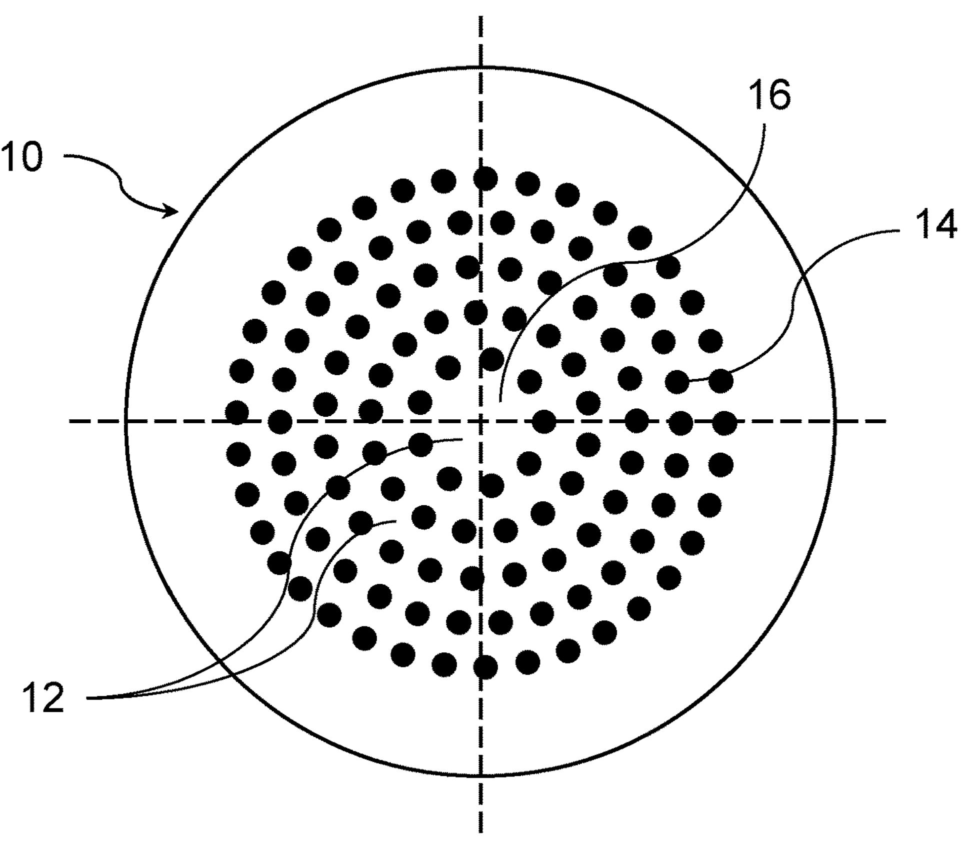
FIG. 1 illustrates a schematic front view of a lens element according to an embodiment of the disclosure.
Figure 2:
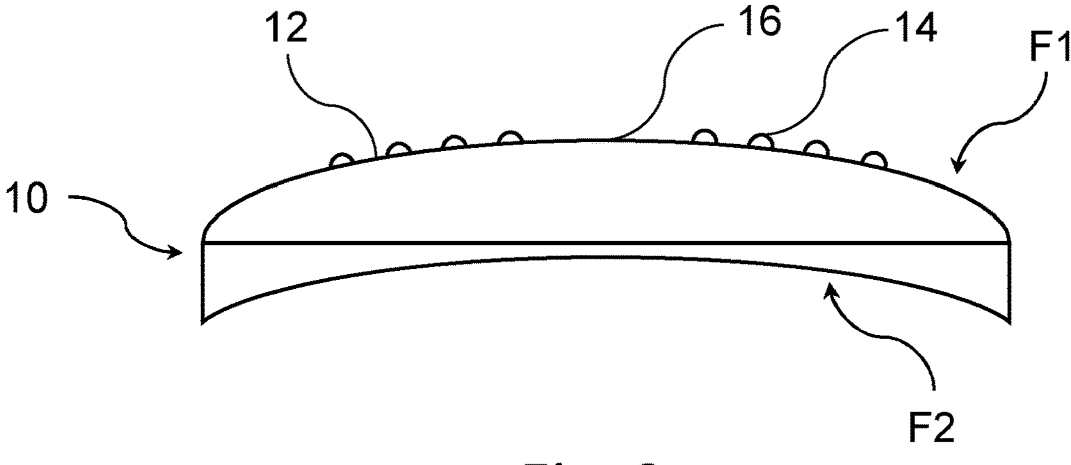
FIG. 2 illustrates a schematic profile view a lens element according to an embodiment of the disclosure.

As represented in FIGS. 1 and 2, the lens element 10 according to the disclosure comprises a refraction area 12 and a plurality of optical elements 14.

As represented in FIG. 2, the lens element 10 comprises at least a first surface and a second surface opposed to the second surface. For example, the first surface may comprise an object side surface F1 formed as a convex curved surface toward an object side and the second surface may comprise an eye side surface F2 formed as a concave surface having a different curvature than the curvature of the object side surface. The lens element 10 may be made of organic material, for example polycarbonate, or made of mineral material such as glass.

As represented in FIG. 1, the lens element may be divided in three complementary zones, a central zone 16, a nasal zone N and an opposite temporal zone T. The nasal and temporal zones are defined as opposite lateral zones of the lens element separated by a vertical line passing through the optical center of said lens element. In other words, the vertical line passing through a framing reference point of the lens element that faces the pupil of the wearer gazing straight ahead in standard wearing conditions defines the limit between the nasal zone and the temporal zone.

Similarly, the lens element may be divided in three complementary zones, a central zone 16, an upper zone U and an opposite lower zone L. The upper and lower zones are defined as opposite horizontal zones of the lens element separated by a horizontal line passing through the optical center of said lens element. In other words, the horizontal line passing through a framing reference point of the lens element that faces the pupil of the wearer gazing straight ahead in standard wearing conditions defines the limit between the upper zone and the lower zone.

Alternatively, the lens element may be divided in five complementary zones, a central zone 16, an upper-nasal UN zone, an upper-temporal zone UT, a lower-nasal zone LN, and a lower-temporal zone LT.

At least one part, preferably all, of a surface of the lens element 10 may be covered by at last one layer of coating element. The at least one layer of coating element may comprise features selected from the group consisting of anti-scratch, anti-reflection, anti-smudge, anti-dust, UV30 filtration, blue light-filtration, anti-abrasion features.

As illustrated in FIGS. 1 and 2, the lens element 10 comprises a refraction area 12.

The refraction area 12 has a refractive power Px based on the prescription of the eye of the person for which the lens element is adapted. The prescription is for example adapted for correcting an abnormal refraction of the eye of the wearer.

The term "prescription" is to be understood to mean a set of optical characteristics of optical power, of astigmatism, of prismatic deviation, determined by an ophthalmologist or optometrist in order to correct the vision defects of the eye, for example by means of a lens positioned in front of his eye. For example, the prescription for a myopic eye comprises the values of optical power and of astigmatism with an axis for the distance vision.

The prescription may comprise an indication that the eye of the wearer has no defect and that no refractive power is to be provided to the wearer. In such case the refractive area is configured so as to not provide any refractive power.

The refraction area is preferably formed as the area other than the areas formed of the plurality of optical elements. In other words, the refraction area is the complementary area to the areas formed of the plurality of optical elements.

As illustrated in FIGS. 1 and 2, the refraction area 12 may comprise at least the central zone 16 of the lens element 10.

The central zone 16 may have a characteristic dimension greater than 4 mm and smaller than 22 mm, for example smaller than 20 mm.

The central zone 16 may be centered on a reference point of the lens element 10. The reference point on which the central zone may be centered is either one of a geometrical center and/or an optical and/or a near vision reference point and/or a far vision reference point of the lens element.

Preferably, the central zone 16 is centered on, or at least comprises a framing reference point that faces the pupil of the wearer gazing straight ahead in standard wearing conditions.

The wearing conditions are to be understood as the position of the lens element with relation to the eye of a wearer, for example defined by a pantoscopic angle, a wrap angle, a Cornea to lens distance, and eventually any of a Pupil-cornea distance, a center of rotation of the eye (CRE) to pupil distance, a CRE to lens distance and.

The Cornea to lens distance is the distance along the visual axis of the eye in the primary position (usually taken to be the horizontal) between the cornea and the back surface of the lens; for example comprised between 8 and 16 mm, preferably 10 and 14 mm, more preferably equal to 12 mm.

The Pupil-cornea distance is the distance along the visual axis of the eye between its pupil and cornea; usually comprised between 1 and 3 mm, for example equal to 2 mm.

The CRE to pupil distance is the distance along the visual axis of the eye between its center of rotation (CRE) and cornea; for example comprised between 10 and 13 mm, preferably 11 and 12 mm, more preferably equal to 11.5 mm.

The CRE to lens distance is the distance along the visual axis of the eye in the primary position (usually taken to be the horizontal) between the CRE of the eye and the back surface of the lens, for example comprised between 20 and 30 mm, preferably 22.5 and 28 mm, more preferably equal to 25.5 mm.

The pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example comprised between −25° and +5°, preferably −12° and 0°, more preferably between −10° and −6°, for example equal to −8°, preferably equal to 0°.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position for example comprised between −10° and +25°, preferably 0° and 10°, more preferably between 0° and +5°, for example equal to 0°.

An example of standard wearing condition may be defined by a pantoscopic angle of −8°, a Cornea to lens distance of 12 mm, a Pupil-cornea distance of 2 mm, a CRE to pupil distance of 11.5 mm, a CRE to lens distance of 25.5 mm and a wrap angle of 0°.

Another example of standard wearing condition more adapted for younger wearers may be defined by a pantoscopic angle of 0°, a Cornea to lens distance of 12 mm, a Pupil-cornea distance of 2 mm, a CRE to pupil distance of 11.5 mm, a CRE to lens distance of 25.5 mm and a wrap angle of 0°.

Preferably, the central zone 16 comprises the optical center of the lens and has a characteristic dimension greater than 4 mm—corresponding to +/−6° peripheral angle on the retina side, and smaller than 22 mm corresponding to +/−440 peripheral angle on the retina side, for example smaller than 20 mm corresponding to +/−40° peripheral angle on the retina side. The characteristic dimension may be a diameter or the major minor axes of an ellipse shaped central zone.

The refraction area 12 may further comprise at least a second refractive power Pp different from the prescribed refractive power Px. In the sense of the invention, the two refractive powers are considered different when the difference between said refractive powers is greater than or equal to 0.5 D.

When the refractive power Px is prescribed to compensate a myopia of the eye of the wearer, the second refractive power Pp may be greater than the refractive power Px.

When the refractive power Px is prescribed to compensate hyperopia of the eye of the wearer, the second refractive power Pp may be smaller than the refractive power Px.

The refraction area 12 may comprise a continuous variation of refractive power. For example, the refractive area may have a progressive addition design. The optical design of the refraction area may comprise a fitting cross where the optical power is negative, and a first zone extending in the temporal side of the refractive are when the lens element is being worn by a wearer. In the first zone, the optical power increases when moving towards the temporal side, and over the nasal side of the lens, the optical power of the ophthalmic lens is substantially the same as at the fitting cross. Such optical design is disclosed in greater details in WO2016/107919.

Alternatively, the refractive power in the refraction area 12 may comprise at least one discontinuity.

As illustrated in FIGS. 1 and 2, the lens element 10 comprises a plurality of optical elements 14.

The plurality of at least three optical elements have an optical function of not focusing an image on the retina of the eye of the wearer. In other words, when the wearer wears the lens element, for example in standard wearing conditions, rays of light passing through the plurality of optical elements will not focus on the retina of the eye of the wearer. In other words, the optical function of not focusing on the retina of the plurality of at least three optical elements provides a perturbated image, for example an image of reduced quality, on the retina of the wearer.

The optical function of not focusing on the retina is considered for a wearer wearing the lens element, for example in standard wearing conditions, and looking straight ahead at a target object, preferably located at infinity, in central vision. The eye of the wearer is preferably considered to be in an unaccommodated state when looking at an object located at infinite. However, a person of ordinary skill in the art would be able to use known accommodative response models to vary the accommodative state of the eye of the wearer according to the distance between the eye of the wearer and the object he or she is looking at. In other words, when the wearer wears the lens element in standard wearing conditions, rays of light from an object located at infinite and passing through, in central vision, the plurality of optical elements will be deviated differently compared to the rays of light passing through the refraction area and will not focus on the retina of the eye.

Advantageously, not focusing an image on the retina of the wearer allows creating a control signal that suppresses, reduces, or at least slows down the progression of abnormal refractions, such as myopia or hyperopia, of the eye of the person wearing the lens element.

The optical function of not focusing an image on the retina of the eye of the wearer may be a transparent optical function. For example, the optical function of not focusing an image on the retina of the eye may be a refractive optical function creating a volume of focused or defocused light in front and/or behind the retina of the eye.

At least one, preferably more than 50%, more preferably all the optical elements 14 may be configured, for example in standard wearing conditions, to focus elsewhere than on the retina of the wearer. In other words, the plurality of optical elements may be configured to focus in front and/or behind the retina of the eye of the wearer.

At least one, preferably more than 50%, for example all, of the optical elements 14 has a shape configured so as to create a caustic in front of the retina of the eye of the person. In other words, such optical element is configured so that, when the person wears the lens element in standard viewing condition, every section plane where the light flux is concentrated if any, is located in front or behind of the retina of the eye of the person.

At least one, for example more than 50%, preferably all, of the optical elements may have a spherical optical function in standard wearing conditions.

At least one, for example more than 50%, preferably all, of the optical elements may have a non-spherical optical function in standard wearing conditions. By "non-spherical optical function", it should be understood as not having a single focus point. For example, rays of light passing through the optical elements having a non-spherical optical function will provide a volume of not focused light.

At least one, for example more than 50%, preferably all, of the optical elements may comprise a cylindrical power.

At least one, for example more than 50%, preferably all, of the optical elements may be a multifocal refractive micro-lens. In the sense of the invention, "multifocal refractive micro-lens" includes bifocals (with two focal powers), trifocals (with three focal powers), progressive addition lenses, with continuously varying focal power, for example aspherical surface lenses.

At least one, for example more than 50%, preferably all, of the optical elements may be an aspherical microlens. In the sense of the invention, aspherical microlenses have a continuous power evolution over their surface, for example from a geometrical or optical center to the periphery of the microlens.

An aspherical microlens may have a difference between the average mean optical power measured in the center of the microlens and the average mean optical power measured in the periphery of the microlens comprised between 0.1 D and 10 D, preferably between 0.1 D and 3 D in absolute value. The center of the microlens may be defined by a circular area centered on the geometrical center of the microlens and having a diameter comprised between 0.1 mm and 0.5 mm, preferably equal to 0.2 mm. The periphery of the microlens may be defined by an annular zone centered on the geometrical center of the microlens and having an inner diameter comprised between 0.5 mm and 0.7 mm and an outer diameter comprised between 0.70 mm and 0.80 mm. According to an embodiment of the invention, the aspherical microlenses have an optical power in their geometrical center comprised between 2.0 D and 7.0 D in absolute value, and an optical power in their periphery comprised between 1.5 D and 6.0 D in absolute value. The values of the optical power measured for the optical elements and the microlenses are to be considered in term of relative addition to the optical power Px of the refractive area on which said optical elements or microlenses are disposed.

At least one, for example more than 50%, preferably all, of the optical elements may comprise an aspherical surface, with or without a rotational symmetry.

At least one, for example more than 50%, preferably all, of the optical elements may comprise a toric surface. A toric surface is a surface of revolution that can be created by rotating a circle or arc about an axis of revolution (eventually positioned at infinity) that does not pass through its center of curvature. Toric surface lenses have two different radial profiles at right angles to each other, therefore producing two different focal powers. Toric and spheric surface components of toric lenses produce an astigmatic light beam, as opposed to a single point focus.

At least one, preferably more than 50%, for example all, of the optical element, is made of a birefringent material. In other words, the optical element is made of a material having a refractive index that depends on the polarization and propagation direction of light. The birefringence may be quantified as the maximum difference between refractive indices exhibited by the material.

The optical function of not focusing on the retina of the eye of the wearer may be a diffractive function that redirects and focuses light other than on the retina of the wearer. At least one, preferably more than 50%, for example all of the optical element, is made of a diffractive microlens. At least one, preferably more than 50%, for example all, of the diffractive microlenses may comprise a metasurface structure as disclosed in WO2017/176921. The diffractive microlens may be a Fresnel lens whose phase function $\psi(r)$ has $\pi$ phase jumps at the nominal wavelength. One may give these structures the name "$\pi$-Fresnel lenses" for clarity's sake, as opposition to unifocal Fresnel lenses whose phase jumps are multiple values of $2\pi$. The $\pi$-Fresnel lens whose phase function is displayed in FIG. 5 diffracts light mainly in two diffraction orders associated to dioptric powers 0 δ and a positive one P, for example 3 S.

At least one, preferably more than 50%, for example all of the optical element, is a multifocal binary component A binary structure displays mainly two dioptric powers simultaneously, for example denoted −P/2 and P/2.

At least one, preferably more than 50%, for example all of the optical element, is a pixelated lens. An example of multifocal pixelated lens is disclosed in Eyal Ben-Eliezer et al, APPLIED OPTICS, Vol. 44, No. 14, 10 May 2005.

The optical function of not focusing on the retina of the eye of the wearer may be a scattering function creating scattered volumes of light in front and/or behind the retina of the wearer.

At least two, preferably more than 50%, for example all, of the optical elements are independent. In the sense of the invention, two optical elements are considered as independent if producing independent images. In particular, when illuminated by a parallel beam "in central vision", each "independent contiguous optical element" forms on a plane in the image space a spot associated with it. In other words, when one of the "optical element" is hidden, the spot disappears even if this optical element is contiguous with another optical element.

The optical elements 14 are organized based at least on the prescribed refractive power Px of the refractive area 12 and the shape of the spectacle frame.

The optical elements have an optical function of not focusing on the retina of the eye. The optical elements create a volume of focused or defocused light in front or behind the retinal of the eye of the wearer, thereby generating stop signals that slow down the progression of an abnormal refraction of an eye of the wearer. The inventors have discovered that the efficiency of these stop signals depends on the repartition of these volume of light compared to the retina of the eye.

When the nasal part of the lens element is greater than the temporal part of the lens element, the quantity of volumes of focused or defocused volumes of light will be greater in front and/or behind the temporal part of retina of the wearer than the nasal part of the retina of the wearer. Such difference will lead to a stronger stop signal in the temporal region of the retina versus the nasal region and thus will lead to a non-uniform control of the elongation of the eye.

Taking into account the refractive power of the refraction area and the shape of the spectacle frame in the organization of the optical elements allows generating similar volumes of light on both sides of the retina axis. In other words, the stop signals created by the volumes of light are uniformized in the eye, thereby improving the slowdown of the progression of the abnormal refraction of the eye. Moreover, considering the refractive power of the refraction area and the shape of the spectacle frame allows maintaining good visual performances for the wearer. In other words, the invention allows both improving the slowing down the progression of the abnormal refraction of the eye of the wearer and maintaining the best visual acuity for the wearer.

Figure 3:
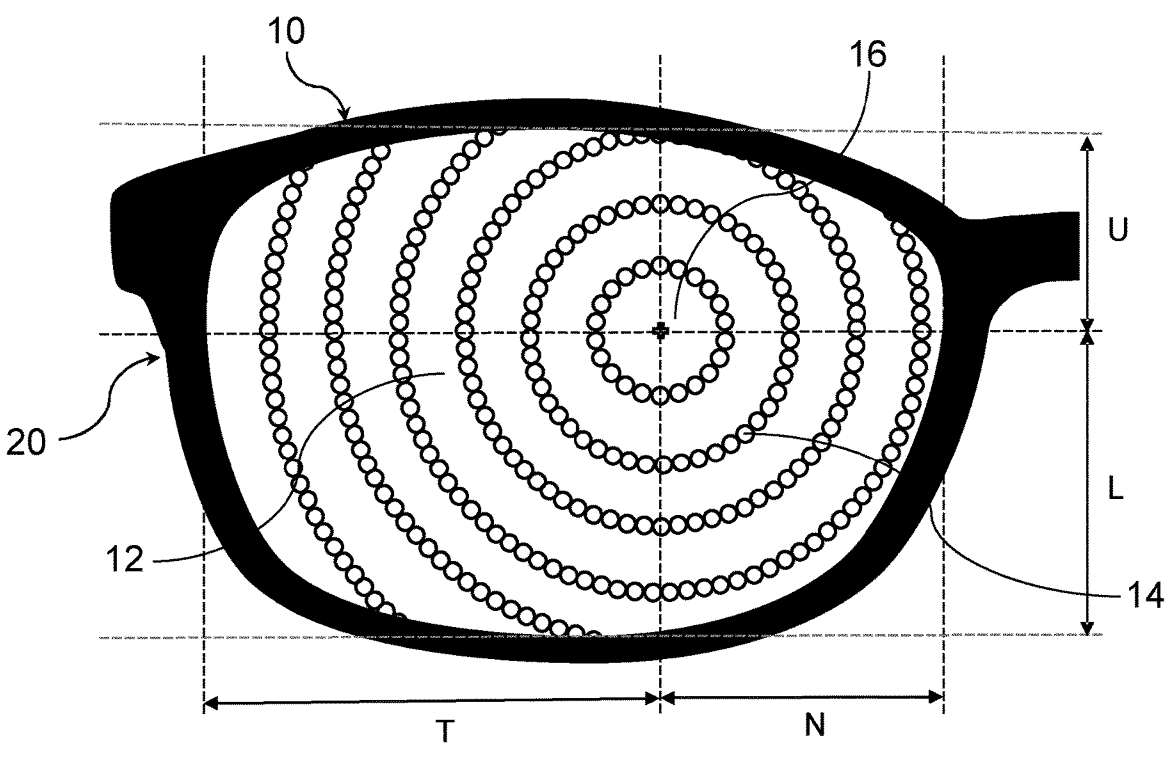
FIG. 3 illustrates a front view of a mounted lens element of the prior art.

As represented in FIG. 3, lens designs of the prior art comprises optical elements that not organized based on the shape of the spectacle frame on which they are mounted. As such, in the example of the prior art, the temporal part of the lens element comprises more optical elements, which will generate more volumes of focused or unfocused light in an area of the eye. The stop signal will thus be stronger in an area of the eye compared to the opposed one. In other words, the slowdown of the abnormal refraction of the eye will be less effective.

The lens element may comprise at least a reference point, for example a geometrical center, and/or an optical center, and/or a fitting point that faces the center of the eye of the wearer looking straight ahead when the lens element is worn in standard wearing conditions. The vertical line passing through said at least one reference point of the lens element separates the lens element in a temporal side and a nasal side, the nasal side being closer to the nose of the wearer when the lens element is worn by the wearer. The horizontal line passing through said at least one reference point of the lens element separates the lens element in an upper side and a lower side.

When the wearer for which the lens element is adapted wears the lens element in standard wearing condition, a temporo-nasal ratio value and an upper-lower ratio value may be defined. The temporo-nasal ratio value quantifies the ratio between a dimension of a nasal side of the lens element and a dimension of an opposite temporal side of the lens element. The upper-lower ratio value quantifies the ratio between a dimension of an upper side of the lens element and a dimension of an opposite lower side of the lens element. For example, the dimension may be the width and/or the heigh of the side, and/or the area of the side.

Figure 4:
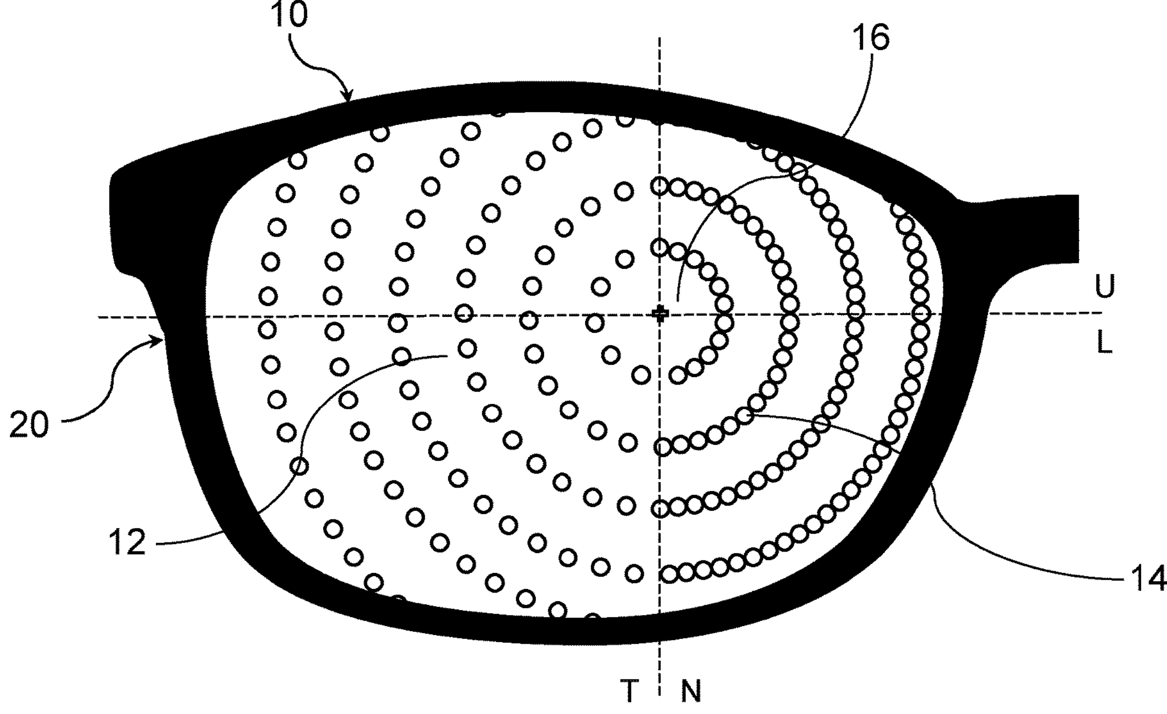
FIG. 4 illustrates a front view of a mounted lens element according to an embodiment of the disclosure.
Figures 5, 6:
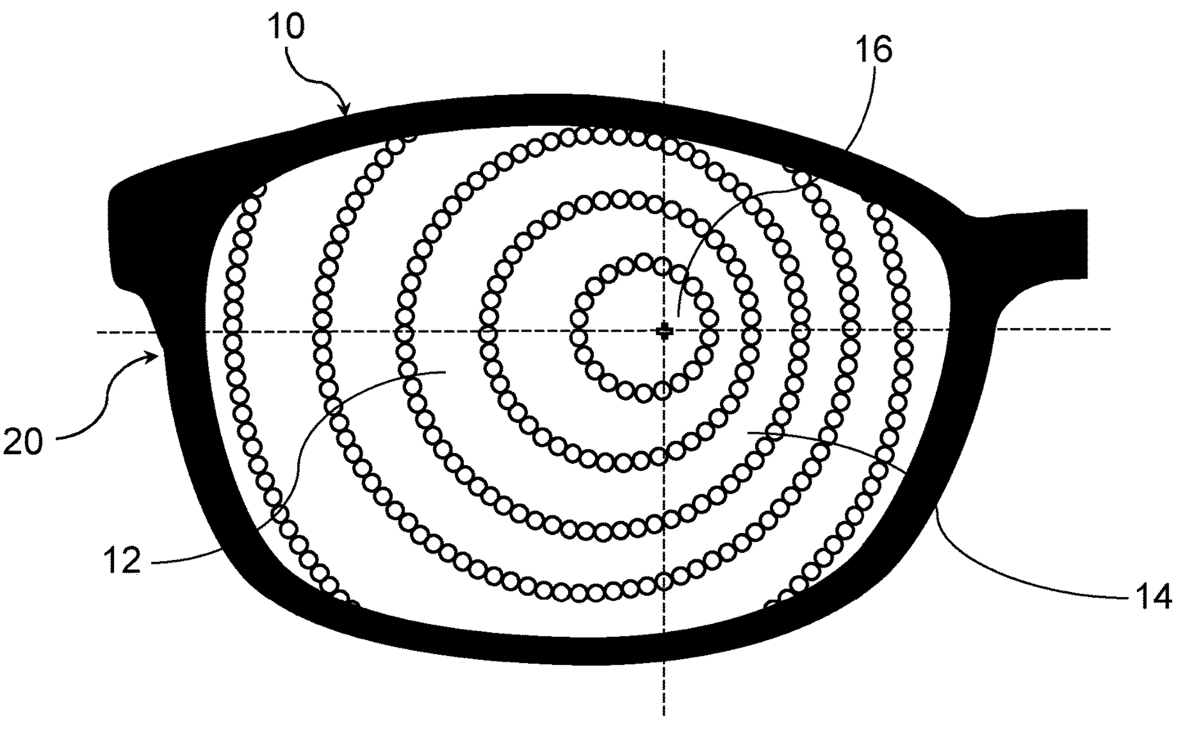
FIG. 5 illustrates a front view of a mounted lens element according to an embodiment of the disclosure.
FIG. 6 illustrates a front view of a mounted lens element according to an embodiment of the disclosure.

As illustrated in FIGS. 4 and 5, the density of optical elements 14 in the nasal side of the lens element may be different from the density of optical elements in the temporal side of the lens element. The ratio of density of optical elements in the nasal and temporal sides may be proportional to the temporo-nasal ratio value. For example, the ratio of density of optical elements in the nasal side and the temporal side is comprised between 0.5 and 2 times, preferably between 0.5 and 1.5 times, the temporo-nasal ratio.

For example, the density of optical elements in the nasal side of the lens element is greater than the density of optical elements in the temporal side of the lens element. Alternatively, the density of optical elements in the nasal side of the lens element is smaller than the density of optical elements in the temporal side of the lens element.

As illustrated in FIG. 3, the spectacle lens comprises a temporal side having a greater area than the nasal side. By increasing the density of optical elements in the nasal side compared to the temporal side of the lens element, a similar stop signal will be generated by the optical elements in the nasal side and the temporal side.

Similarly, the density of optical elements 14 in the upper side of the lens element may be different from the density of optical elements in the lower side of the lens element. The ratio of density of optical elements in the upper and lower sides may be proportional to the upper-lower ratio value. For example, the ratio of density of optical elements in the upper side and the lower side is comprised between 0.5 and 2 times, preferably between 0.5 and 1.5 times, the upper-lower ratio.

For example, the density of optical elements in the upper side of the lens element is greater than the density of optical elements in the lower side of the lens element. Alternatively, the density of optical elements in the upper side of the lens element is smaller than the density of optical elements in the lower side of the lens element.

As illustrated in FIG. 3, the spectacle lens comprises a lower side having a greater area than the upper side. By increasing the density of optical elements in the upper side compared to the lower side of the lens element, a similar stop signal will be generated by the optical elements in the upper side and the lower side.

As illustrated in FIGS. 6, the optical power and/or the mean optical power of optical elements 14 in the nasal side of the lens element may be different from the density of optical elements in the temporal side of the lens element. In order to clarify the description, the following embodiments of the disclosure will be described using the term "optical power". However, it will appear obvious for a person of ordinary skill in the art to the replace the "optical power" by the "mean optical power" when the optical elements are not spherical. The ratio of optical power of the optical elements in the nasal and temporal sides may be proportional to the temporo-nasal ratio value. For example, the ratio of optical power of the optical elements in the nasal side and the temporal side is comprised between 0.5 and 2 times, preferably between 0.5 and 1.5 times, the temporo-nasal ratio.

For example, the optical power of optical elements in the nasal side of the lens element is greater than the optical power of optical elements in the temporal side of the lens element. Alternatively, the optical power of optical elements in the nasal side of the lens element is smaller than the optical power of optical elements in the temporal side of the lens element.

As illustrated in FIG. 3, the spectacle lens comprises a temporal side having a greater area than the nasal side. By increasing the optical power of optical elements in the nasal side compared to the temporal side of the lens element, a similar stop signal will be generated by the optical elements in the nasal side and the temporal side.

Similarly, the optical power of optical elements 14 in the upper side of the lens element may be different from the optical power of optical elements in the lower side of the lens element. The ratio of optical power of the optical elements in the upper and lower sides may be proportional to the upper-lower ratio value. For example, the ratio of optical power of the optical elements in the upper side and the lower side is comprised between 0.5 and 2 times, preferably between 0.5 and 1.5 times, the upper-lower ratio.

For example, the optical power of optical elements in the upper side of the lens element is greater than the optical power of optical elements in the lower side of the lens element. Alternatively, the optical power of optical elements in the upper side of the lens element is smaller than the optical power of optical elements in the lower side of the lens element.

As illustrated in FIG. 3, the spectacle lens comprises a lower side having a greater area than the upper side. By increasing the optical power of optical elements in the upper side compared to the lower side of the lens element, a similar stop signal will be generated by the optical elements in the upper side and the lower side.

Figure 7:
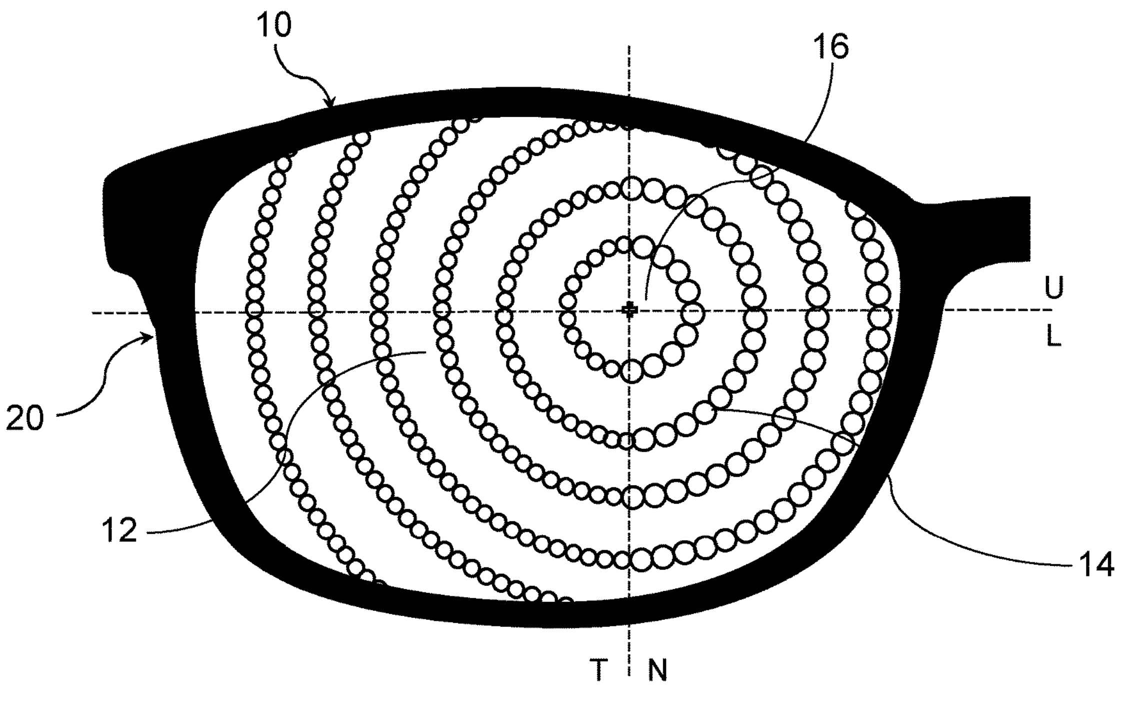
FIG. 7 illustrates a front view of a mounted lens element according to an embodiment of the disclosure.

As illustrated in FIGS. 7, the size, for example the diameter, of the optical power of optical elements 14 in the nasal side of the lens element may be different from the size of optical elements in the temporal side of the lens element. The ratio of the size of optical elements in the nasal and temporal sides may be proportional to the temporo-nasal ratio value. For example, the ratio of size of the optical elements in the nasal side and the temporal side is comprised between 0.5 and 2 times, preferably between 0.5 and 1.5 times, the temporo-nasal ratio.

For example, the size of optical elements in the nasal side of the lens element is greater than the size of optical elements in the temporal side of the lens element. Alternatively, the size of optical elements in the nasal side of the lens element is smaller than the size of optical elements in the temporal side of the lens element.

As illustrated in FIG. 3, the spectacle lens comprises a temporal side having a greater area than the nasal side. By increasing the size of optical elements in the nasal side compared to the temporal side of the lens element, a similar stop signal will be generated by the optical elements in the nasal side and the temporal side.

Similarly, the size of optical elements 14 in the upper side of the lens element may be different from the size of optical elements in the lower side of the lens element. The ratio of size of the optical elements in the upper and lower sides may be proportional to the upper-lower ratio value. For example, the ratio of size of the optical elements in the upper side and the lower side is comprised between 0.5 and 2 times, preferably between 0.5 and 1.5 times, the upper-lower ratio.

For example, the size of optical elements in the upper side of the lens element is greater than the size of optical elements in the lower side of the lens element. Alternatively, the size of optical elements in the upper side of the lens element is smaller than the size of optical elements in the lower side of the lens element.

As illustrated in FIG. 3, the spectacle lens comprises a lower side having a greater area than the upper side. By increasing the size of optical elements in the upper side compared to the lower side of the lens element, a similar stop signal will be generated by the optical elements in the upper side and the lower side.

The prismatic angle of the optical power of optical elements 14 in the nasal side of the lens element may be different from the prismatic angle of optical elements in the temporal side of the lens element. The difference between the prismatic angle of optical elements in the nasal and temporal sides may be proportional to the temporo-nasal ratio value. For example, the difference of prismatic angle of the optical elements in the nasal side and the temporal side is comprised between 0.5 and 2 times, preferably between 0.5 and 1.5 times, the temporo-nasal ratio. Similarly to the values of the optical power of the optical elements, the prismatic angles measured for the optical elements are to be considered relatively to the base curvature of the lens element on which said optical elements are disposed.

For example, the prismatic angle of the optical elements in the nasal side of the lens element is greater than the prismatic angle of optical elements in the temporal side of the lens element. Alternatively, the prismatic angle of optical elements in the nasal side of the lens element is smaller than the prismatic angle of optical elements in the temporal side of the lens element.

As illustrated in FIG. 3, the spectacle lens comprises a temporal side having a greater area than the nasal side. By increasing the prismatic angle of optical elements in the nasal side compared to the temporal side of the lens element, a similar stop signal will be generated by the optical elements in the nasal side and the temporal side.

Similarly, the prismatic angle of optical elements 14 in the upper side of the lens element may be different from the prismatic angle of optical elements in the lower side of the lens element. The difference between the prismatic angle of optical elements in the upper and lower sides may be proportional to the upper-lower ratio value. For example, the difference of prismatic angle of the optical elements in the upper side and the lower side is comprised between 0.5 and 2 times, preferably between 0.5 and 1.5 times, the upper-lower ratio.

For example, the prismatic angle of optical elements in the upper side of the lens element is greater than the prismatic angle of optical elements in the lower side of the lens element. Alternatively, the prismatic angle of optical elements in the upper side of the lens element is smaller than the prismatic angle of optical elements in the lower side of the lens element.

As illustrated in FIG. 3, the spectacle lens comprises a lower side having a greater area than the upper side. By increasing the prismatic angle of optical elements in the upper side compared to the lower side of the lens element, a similar stop signal will be generated by the optical elements in the upper side and the lower side.

The optical elements 14 may be configured so that along at least one section, for example a plurality of sections, of the lens element, the mean sphere of the optical elements varies, for example increases or decreases, from a point of said section towards the peripheral part of said section.

As is known, a minimum curvature $CURV_{min}$ is defined at any point on an aspherical surface by the formula:

$$CURV_{min} = \frac{1}{R_{max}}$$

where $R_{max}$ is the local maximum radius of curvature, expressed in meters and $CURV_{min}$ is expressed in diopters.

Similarly, a maximum curvature $CURV_{max}$ can be defined at any point on an aspheric surface by the formula:

$$CURV_{max} = \frac{1}{R_{min}}$$

where $R_{min}$ is the local minimum radius of curvature, expressed in meters and $CURV_{max}$ is expressed in diopters.

It can be noticed that when the surface is locally spherical, the local minimum radius of curvature $R_{min}$ and the local maximum radius of curvature $R_{max}$ are the same and, accordingly, the minimum and maximum curvatures $CURV_{min}$ and $CURV_{max}$ are also identical. When the surface is aspherical, the local minimum radius of curvature $R_{min}$ and the local maximum radius of curvature $R_{max}$ are different.

From these expressions of the minimum and maximum curvatures $CURV_{min}$ and $CURV_{max}$, the minimum and maximum spheres labelled $SPH_{min}$; and $SPH_{max}$ can be deduced according to the kind of surface considered.

When the surface considered is the object side surface (also referred to as the front surface), the expressions are the following:

$$SPH_{min} = (n-1)*CURV_{min} = \frac{n-1}{R_{max}},$$

and $$SPH_{min} = (n-1)*CURV_{min} = \frac{n-1}{R_{max}}$$

where n is the index of the constituent material of the lens.

If the surface considered is an eyeball side surface (also referred to as the back surface), the expressions are the following:

$$SPH_{min} = (1-n)*CURV_{min} = \frac{1-n}{R_{max}}$$

and $$SPH_{max} = (1-n)*CURV_{max} = \frac{1-n}{R_{min}}$$

where n is the index of the constituent material of the lens.

As is well known, a mean sphere SPHmean at any point on an aspherical surface can also be defined by the formula:

$$SPH_{mean} = \frac{1}{2}(SPH_{min} + SPH_{max})$$

The expression of the mean sphere therefore depends on the surface considered: if the surface is the object side surface, $$SPH_{mean} = \frac{n-1}{2}\left(\frac{1}{R_{min}} + \frac{1}{R_{max}}\right)$$

if the surface is an eyeball side surface, $$SPH_{mean} = \frac{1-n}{2}\left(\frac{1}{R_{min}} + \frac{1}{R_{max}}\right)$$

A cylinder CYL is also defined by the formula:

$$CYL = |SPH_{max} - SPH_{min}|.$$

The optical elements 14 may be configured so that along at least one section of the lens element, the mean cylinder of the optical elements varies, for example increases or decreases, from a point of said section towards the peripheral part of said section.

Varying the mean sphere and/or mean cylinder of the optical elements along a section of the lens element allows varying the defocus and by extension the intensity of the myopia control signal which lead to a better control of the progression of the abnormal refraction of the eye.

The optical elements 14 may be configured so that along the at least one section of the lens element the mean sphere and/or the mean cylinder of the optical elements increases from the center of said section towards the peripheral part of said section.

The optical elements may be configured so that, in standard wearing conditions, the at least one section is a horizontal section.

The refraction area 12 may comprise an optical center and the optical elements 14 may be configured so that along any section passing through the optical center of the lens element, the mean sphere and/or the mean cylinder of the optical elements varies, for example increases from the optical center towards the peripheral part of the lens element.

The refraction area 12 may comprise a far vision reference point, a near vision reference, and a meridian joining the far and near vision reference points, and the optical elements 14 may be configured so that in standard wearing conditions along any horizontal section of the lens element the mean sphere and/or the mean cylinder of the optical elements varies, for example increases from the intersection of said horizontal section with the meridian towards the peripheral part of the lens element.

The mean sphere and/or the mean cylinder increase or decrease function along the sections may be different depending on the position of said section along the meridian.

The mean sphere and/or the mean cylinder increase or decrease function along the sections may be unsymmetrical.

The optical elements 14 may be configured so that along the at least one section of the lens element the mean sphere and/or the mean cylinder of optical elements increases from a first point of said section towards the peripheral part of said section and decreases from a second point of said section towards the peripheral part of said section, the second point being closer to the peripheral part of said section than the first point.

Advantageously, it allows improving the slowdown of the progression of the abnormal refraction of the eye of the wearer.

The mean sphere and/or the mean cylinder varying function along the at least one section may be a Gaussian function or a Quadratic function.

At least part, for example more than 50%, preferably all, of the optical elements 14 may be microlenses having a contour shape being inscribable in a circle having a diameter greater than or equal to 0.2 mm, for example greater than or equal to 0.4 mm, for example greater than or equal to 0.6 mm, for example greater than or equal to 0.8 mm and smaller than or equal to 2.0 mm, for example smaller than or equal to 1.0 mm.

As represented in FIG. 5, at least one, for example all, of the optical elements 14 may be non-contiguous.

As represented in FIG. 4, at least one, preferably all, of the optical elements are contiguous.

In the sense of the disclosure, two optical elements located on a surface of the lens substrate are contiguous if there is a path supported by said surface that links the two optical elements and if along said path one does not reach the basis surface on which the optical elements are located.

When the surface on which the at least two optical elements are located is spherical, the basis surface corresponds to said spherical surface. In other words, two optical elements located on a spherical surface are contiguous if there is a path supported by said spherical surface and linking them and if along said path one may not reach the spherical surface.

When the surface on which the at least two optical elements are located is non-spherical, the basis surface corresponds to the local spherical surface that best fit said non-spherical surface. In other words, two optical elements located on a non-spherical surface are contiguous if there is a path supported by said non-spherical surface and linking them and if along said path one may not reach the spherical surface that best fit the non-spherical surface.

Advantageously, having contiguous optical elements helps improving the aesthetic of the lens element and is easier to manufacture.

At least one, for example all, of the optical elements 14 have an annular shape or semi-annular shape, for example around part of the refraction area. Advantageously, it provides a good repartition of the refraction area and optical elements thereby allowing to provide a better correction of the abnormal refraction of the eye of the wearer while maintaining the effective function of the optical elements to reduce, or at least slow down, the progression of said abnormal refraction.

At least part, for example all, of the optical elements 14 may be located on the front surface of the lens element. The front surface of the lens element corresponds to the object side F1 of the lens element facing towards the object.

At least part, for example all, of the optical elements 14 may be located on the back surface of the lens element. The back surface of the lens element corresponds to the eye side F2 of the lens element facing towards the eye.

At least part, for example all, of the optical elements 14 may be located between the front and the back surfaces of the lens element, for example when the lens element is encapsulated between two lens substrates. Advantageously, it provides a better protection to the optical elements.

According to an embodiment of the invention, a first part of optical elements 14, for example at least 25% of optical elements, preferably at least 50% of the optical elements are located on the back surface F2 of the lens element 10, and the rest of the optical elements are located at least on one of the front surface F1 and/or between the front and the back surfaces of the lens element.

Alternatively, the lens element may comprise an ophthalmic lens bearing the refraction area 12 and a clip-on bearing the plurality of optical elements 14 and adapted to be removably attached to the ophthalmic lens when the lens element is worn. Advantageously, it allows managing when the function of slowing down the abnormal refraction of the eye should be present.

For every circular zone having a radius comprised between 2 and 4 mm comprising a geometrical center located at a distance of the optical center of the lens element greater or equal to said radius+5 mm, the ratio between the sum of areas of the optical elements 14 located inside said circular zone and the area of said circular zone is comprised between 20% and 70%.

The optical elements may be randomly disturbed on the lens element. Alternatively, the optical elements are positioned on the lens element on a network, for example a structured mesh. The structured mesh may be a squared mesh or a hexagonal mesh or a triangle mesh or an octagonal mesh. Alternatively, the mesh structure may be a random mesh, for example a Voronoi mesh.

As illustrated in FIGS. 2 to 6, the optical elements 14 may be organized along a plurality of concentric rings. The concentric rings of optical elements may be annular rings.

Advantageously, such configuration provides a great balance between the slowdown of the abnormal refraction of the eye of the wearer and the visual performances or comfort of the wearer.

In particular, the optical elements may be organized in at least two groups of optical elements, each group of optical elements being organized in at least two concentric rings having the same center. The concentric ring of each group of optical elements is defined by an inner diameter and an outer diameter.

The inner diameter of a concentric ring of each group of optical elements corresponds to the smallest circle that is tangent to at least one optical element of said group of optical elements. The outer diameter of a concentric ring of optical element corresponds to the largest circle that is tangent to at least one optical element of said group.

For example, the lens element may comprise n rings of optical elements, $f_{inner\ 1}$ referring to the inner diameter of the concentric ring which is the closest to the optical center of the lens element, $f_{outer\ 1}$ referring to the outer diameter of the concentric ring which is the closest to the optical center of the lens element.

The distance D; between two successive concentric rings of optical elements i and i+1 may be expressed as:

$$D_i = |f_{inner\ i+1} - f_{outer\ i}|,$$

wherein $f_{outer\ i}$ refers to the outer diameter of a first ring of optical elements i and $f_{inner\ i+1}$ refers to the inner diameter of a second ring of optical elements i+1 that is successive to the first one and closer to the periphery of the lens element.

The optical elements may be organized in concentric rings centered on the optical center of the surface of the lens element. In other words, the optical center of the lens element and the center of the concentric rings of optical elements may coincide. For example, the geometrical center of the lens element, the optical center of the lens element, and the center of the concentric rings of optical elements coincide. In the sense of the disclosure, the term coincide should be understood as being really close together, for example distanced by less than 1.0 mm.

The distance $D_i$ between two successive concentric rings may vary according to i. For example, the distance $D_i$ between two successive concentric rings may vary between 1.0 mm and 5.0 mm.

The distance $D_i$ between two successive concentric rings of optical elements may be greater than 1.00 mm, preferably 2.0 mm, more preferably 4.0 mm, even more preferably 5.0 mm. Advantageously, having the distance $D_i$ between two successive concentric rings of optical elements greater than 1.00 mm allows managing a larger refraction area between these rings of optical elements and thus provides better visual acuity.

According to an embodiment of the disclosure, the distances $D_i$ between two successive concentric rings i and i+1 may increase when i increases towards the periphery of the lens element.

The concentric rings of optical elements may have a diameter comprised between 9 mm and 60 mm.

The lens element may comprise optical elements disposed in at least two concentric rings, preferably more than 5, more preferably more than 10 concentric rings. For example, the optical elements may be disposed in 11 concentric rings centered on the optical center of the lens.

The diameter di of all optical elements on a concentric ring of the lens element may be identical. For example, all the optical elements on the lens element have an identical diameter.

Alternatively, the optical elements 14 may be organized along a plurality of radial segments. The radial segments may be centered on a reference point of the lens element, for example on the optical or geometrical center of the lens element.

The inventors have observed that the level of myopia control signal delivered over the oblique directions is notably higher than the one proposed over the cardinal directions, thereby leading to a globally better myopia control treatment without side effects in terms of visual perception. In other words, such configuration improves the slowdown of the abnormal refraction of the eye of the wearer while maintaining optimum visual performances or comfort of the wearer.

The optical elements may be configured so that along at least one section of the lens the size or diameter of the optical elements varies, for example increases or decreases, from a point of said section towards the peripheral part of said section.

The optical elements may be configured so that the size or diameter of the optical elements increases from a first point of said section of the lens element towards the peripheral part of said section and decrease from a second point of said section towards the peripheral part of said section, the second point being closer to the peripheral part of said section than the first point.

The lens element may further comprise optical elements positioned radially between two concentric rings.

Different models or brands of spectacle frame having different shapes may be categorized according to a temporo-nasal ratio and/or upper-lower ratio defined for a generic model wearer under standard wearing conditions. For each of these spectacle frame categories, a set of lens elements for which the arrangement of optical elements is adapted may be defined.

The disclosure further relates to an eyewear equipment adapted to be worn by a wearer. The eyewear equipment comprises at least one, for example two lens elements adapted for the wearer.

Figure 8:
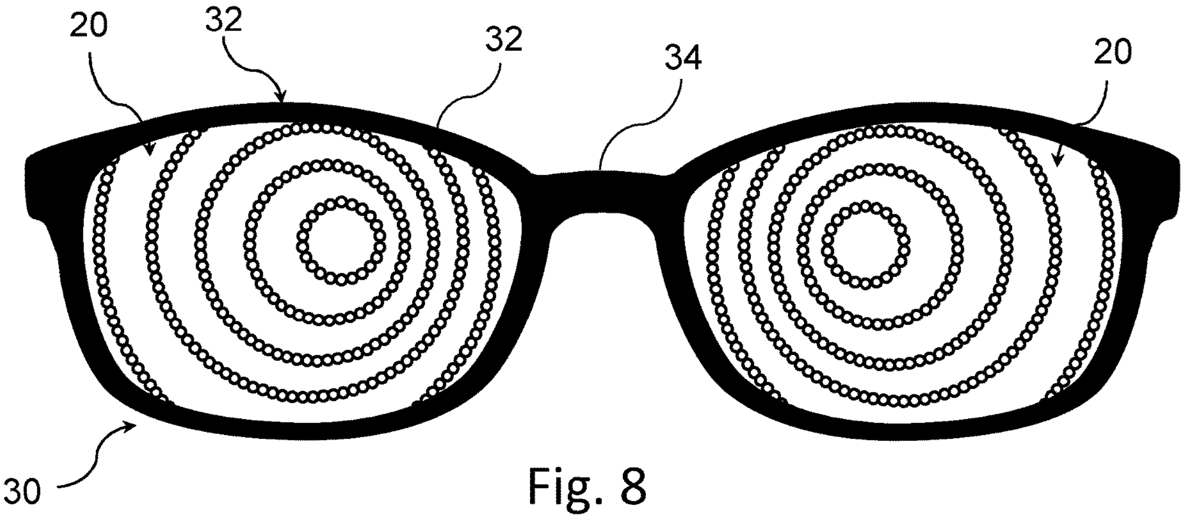
FIG. 8 illustrates a front view of an eyewear equipment comprising two lens elements according to an embodiment of the disclosure.

As illustrated in FIG. 8, the eyewear equipment 30 is a classic eyewear equipment well known by those skilled in the art and comprising a spectacle frame 32, a bridge 34 and temples 36. For the sake of clarity, the temples 36 have been represented on FIG. 8. The lens elements 20 are mounted on the spectacle frame.

The disclosure further relates to a method, for example implemented by computer means, for determining and/or optimizing and/or providing a lens element 10 intended to be mounted on a spectacle frame and to be worn in front of an eye of a wearer according to the disclosure.

Figure 9:
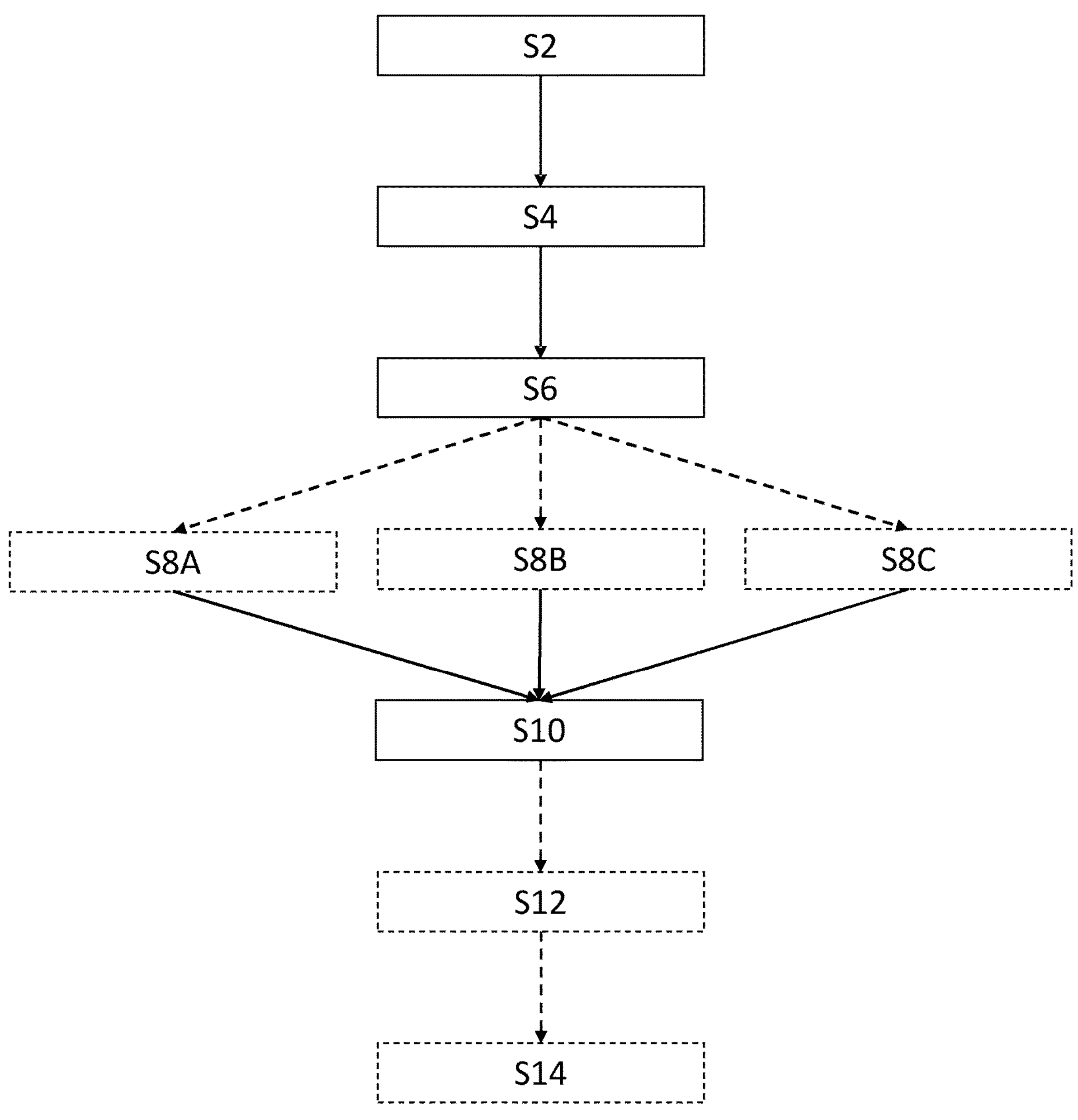
FIG. 9 illustrates a chart-flow embodiment of the method for providing a lens element according to an embodiment of the disclosure.

As illustrated in FIG. 9, the method comprises a step S2 during which frame data are obtained. The frame data comprise at least data representing the spectacle frame on which the lens element is intended to be mounted.

The frame data comprise at least one of a quotation A being the dimension corresponding to the horizontal boxing width of the spectacle frame, and/or quotation B being the dimension corresponding to the vertical boxing length, and/or dimension of the bridge, and/or contour of the spectacle frame, and/or a 2D frontal projection of the spectacle frame, and/or a 3D representation of the spectacle frame.

The frame data may relate to a selected predefined categories of spectacle frames. Most spectacles frame designs from different brands may be categorized in sets of spectacle frames with similar dimensions. Accordingly, spectacles frame designs may be categorized for example based on a specific dimension, such as the dimension A, and/or dimension B, and/or dimension of the bridge. Furthermore, the categories of spectacle frame may be based on the pupillary distance.

As illustrated in FIG. 9, the method comprises a step S4 during which wearer's data are obtained. The wearer's data represent at least one parameter of the face of the wearer.

The wearer's data comprise at least one of pupillary distance, and/or position of the eye of the wearer, and/or a 2D frontal projection of the face of the wearer, and/or a 3D representation of the face of the wearer.

The wearer's data may further comprise data relating to the general morphology of the eye such as, the eye rotation center ERC, the pupil, the cornea, and/or relating to the shape of the retina. The data relating to the morphology of the eye and the shape of the retina may be based on a predetermined eye model or measured on the wearer.

The method further comprises a step S6 of determining fitting data based on the frame data and wearer's data. The fitting data represent the spectacle frames positioned on the face of the wearer.

The fitting data may comprise the value of pupil height inside the spectacle frame and/or the position of the eye inside a lens mounted on the spectacle frame.

The fitting data may comprise wearing condition data relating to wearing conditions of the lens element 10 adapted for the wearer. For example, the wearing condition data may correspond to standard wearing conditions. Alternatively, the wearing conditions data may be measured on the wearer and/or customized for example based on morphological or postural information obtained from the wearer.

The fitting data may comprise a distance between the eye of the wearer and the back surface of the lens element.

The method according to the disclosure further comprise a step S10 of determining and/or optimizing at least one parameter of the optical elements based on the fitting data. Preferably, the at least one parameter of the optical elements in a specific side of the lens element, for example the nasal side, the temporal side, the upper side, or the lower side is optimized.

Advantageously, optimizing at least one parameter of the optical elements based on the fitting data allows providing a lens element comprising areas having different optical properties that takes into consideration the shape of the spectacle frame. In particular, the process allows providing a lens element best adapted for the wearer, providing at the same time an optimum function of slowing down an abnormal refraction of the wearer while maintaining the best visual performances and/or comfort for the wearer.

Optimizing at least one parameter of the optical elements may comprise determining a first density of optical elements in a first side of the lens element, for example one of the nasal side, the temporal side, the upper side, or the lower side. The first density of optical elements in the first side of the lens element is different from the density of the optical elements in the opposite second side of the lens element.

Optimizing at least one parameter of the optical elements may comprise determining a first optical power of optical elements in a first side of the lens element, for example one of the nasal side, the temporal side, the upper side, or the lower side. The first optical power of optical elements in the first side of the lens element is different from the optical power of the optical elements in the opposite second side of the lens element.

Optimizing at least one parameter of the optical elements may comprise determining a first size, for example a diameter, of optical elements in a first side of the lens element, for example one of the nasal side, the temporal side, the upper side, or the lower side. The first size of optical elements in the first side of the lens element is different from the size of the optical elements in the opposite second side of the lens element.

Optimizing at least one parameter of the optical elements may comprise determining a first prismatic angle of optical elements in a first side of the lens element, for example one of the nasal side, the temporal side, the upper side, or the lower side. The first prismatic angle of optical elements in the first side of the lens element is different from the prismatic angle of the optical elements in the opposite second side of the lens element.

Optimizing the at least one parameter of the optical elements may comprise determining a disposition of the optical elements and a size of the central zone of the lens element.

As illustrated in FIG. 9, the method may further comprise a step S8A of determining a temporo-nasal ratio based on the fitting data. The temporo-nasal ratio quantifies the ratio between a dimension of a nasal side of the lens element and a dimension of an opposite temporal side of the lens element. For example, the dimension may be the width and/or the heigh of the side, and/or the area of the side.

The at least one parameter of the optical elements may further be optimized based on the temporo-nasal ratio.

As illustrated in FIG. 9, the method may further comprise a step S8B of determining a upper-lower ratio based on the fitting data. The upper-lower ratio quantifies the ratio between a dimension of an upper side of the lens element and a dimension of an opposite lower side of the lens element. For example, the dimension may be the width and/or the heigh of the side, and/or the area of the side.

The at least one parameter of the optical elements may further be optimized based on the upper-lower ratio.

As illustrated in FIG. 9, the method may further comprise a step S8C of determining the lens-eye distance based on the fitting data. The lens-eye distance corresponds to the distance between the back surface of the lens mounted on the spectacle frame and the eye of the wearer.

The at least one parameter of the optical elements may further be optimized based on the lens-eye distance.

The method may further comprise a step S12 of manufacturing the lens element based on the wearer's data and the optimized parameter of the optical elements.

The method may further comprise a step S14 of applying at least one layer of coating element over at least part of the refraction and part of the optical element.

The disclosure relates to a computer program product comprising one or more stored sequences of instructions that are accessible to a processor and which, when executed by the processor, causes the processor to carry out the steps of a method according to the disclosure.

The disclosure further relates to a computer readable medium carrying one or more sequences of instructions of the computer program product according to the disclosure.

Furthermore, the disclosure relates to a program which makes a computer execute a method of the disclosure.

The disclosure also relates to a computer-readable storage medium having a program recorded thereon; where the program makes the computer execute a method of the disclosure.

The disclosure further relates to a device comprising a processor adapted to store one or more sequence of instructions and to carry out at least one of the steps of a method according to the disclosure.

The disclosure further relates to a non-transitory program storage device, readable by a computer, tangibly embodying a program of instructions executable by the computer to perform a method of the present disclosure.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Many further modifications and variations will be apparent to those skilled in the art upon making reference to the foregoing illustrative embodiments, which are given by way of example only and which are not intended to limit the scope of the disclosure, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the disclosure.

The invention claimed is:

1. A computer-implemented method for determining a lens element to be mounted on a spectacle frame and to be worn in front of an eye of a wearer, the lens element including a refraction area having a refractive power based on prescribed refractive power Px for said eye of the wearer, the refraction area having at least a central zone, a plurality of optical elements having an optical function of not focusing an image on a retina of the eye of the wearer, the method comprising:

obtaining frame data representing the spectacle frame on which the lens element is to be mounted;

obtaining wearer's data representing at least one parameter of a face of the wearer;

determining fitting data representing spectacles positioned on the face of the wearer based on the frame data and the wearer's data;

determining, based on the fitting data, at least one of a temporo-nasal ratio quantifying the ratio between a dimension of a nasal side of the lens element and a dimension of an opposite temporal side of the lens element and an upper-lower ratio quantifying the ratio between a dimension of an upper part of the lens element and a dimension of an opposite lower part of the lens element, and optimizing at least one parameter of the optical elements based on the fitting data and the determined temporo-nasal ratio and/or upper-lower ratio.

2. The method according to claim 1, further comprising determining a lens-eye distance between a back surface of the lens element and the eye of the wearer based on the fitting data, wherein the at least one optical parameter of the optical elements is optimized based on the lens-eye distance.

3. The method according to claim 1, wherein optimizing at least one parameter of the optical elements further comprises determining a first density of the optical elements in a first part of the lens element, the first density being different from the density of the optical elements in the opposite second part of the lens element.

4. The method according to claim 1, wherein optimizing at least one parameter of the optical elements further comprises determining a first optical power of the optical elements in a first part of the lens element, the first optical power being different from the optical power of the optical elements in a second opposite part of the lens element.

5. The method according to claim 1, wherein optimizing at least one parameter of the optical elements further comprises determining a first size of the optical elements in a first part of the lens element, the first size being different from the size of the optical elements in a second opposite part of the lens element.

6. The method according to claim 1, wherein optimizing at least one parameter of the optical elements further comprises determining a first prismatic angle of the optical elements in a first part of the lens element, the first prismatic angle being different from the prismatic angle of the optical elements in a second opposite part of the lens element.

7. The method according to claim 1, wherein optimizing at least one parameter of the optical elements further comprises determining a disposition of the optical elements on the lens element and a size of the central zone.

8. The method according to claim 1, wherein the frame data further comprises at least one of quotation A, and/or quotation B, and/or dimension of bridge, and/or contour of the frame.

9. The method according to claim 1, wherein the frame data relates to a selected predefined category of frame.

10. A lens element to be mounted on a spectacle frame and to be worn in front of an eye of a wearer, the lens element comprising:

a refraction area having a refractive power based on a prescribed refractive power Px for said eye of the wearer and comprising at least a central zone; and a plurality of optical elements having an optical function of not focusing an image on a retina of the eye of the wearer, wherein the lens element comprises a reference point defining a nasal side and temporal side of the lens element and/or an upper side and a lower side of the lens element, said reference point being a fitting point that faces the center of the eye of the wearer looking straight ahead when the lens element is worn in standard wearing conditions, wherein the optical elements are arranged based at least on the prescribed refractive power Px and a shape of the spectacle frame so that the density of optical elements in the nasal side and the density of optical elements in the temporal side are different and the ratio of density of optical elements in the nasal side and the temporal side of the lens element is comprised between 0.5 and 2 times, and/or the density of optical elements in the upper side and the density of optical elements in the lower side are different, and the ratio of density of optical elements in the upper side and the lower side is comprised between 0.5 and 2 times.

11. The lens element according to claim 10, wherein at least one of: a density of optical elements, an optical power of the optical elements, a size of the optical elements, or a prismatic angle of the optical elements, is greater in a nasal side than in a temporal side of the lens element.

12. The lens element according to claim 10, wherein at least one of: a density of optical elements, an optical power of the optical elements, a size of the optical elements, or a prismatic angle of the optical elements, is greater in an upper side than in a lower side of the lens element.

13. An eyewear equipment comprising:

a spectacle frame; and at least one lens element according to claim 10, wherein the at least one lens element is mounted on the spectacle frame.

* * * * *